United States Patent
Hisatomi et al.

(10) Patent No.: US 10,022,713 B2
(45) Date of Patent: Jul. 17, 2018

(54) PHOTOCATALYST FOR WATER SPLITTING, PRODUCTION METHOD FOR SAME, AND PHOTOELECTRODE FOR WATER SPLITTING

(71) Applicants: FUJIFILM Corporation, Tokyo (JP); Japan Technological Research Association of Artificial Photosynthetic Chemical Process, Tokyo (JP); THE UNIVERSITY OF TOKYO, Tokyo (JP)

(72) Inventors: Takashi Hisatomi, Tokyo (JP); Kazunari Domen, Tokyo (JP); Chisato Katayama, Tokyo (JP)

(73) Assignees: FUJIFILM Corporation, Tokyo (JP); Japan Technological Research Association of Artificial Photosynthetic Chemical Process, Tokyo (JP); The University of Tokyo, Tokyo (JP)

(*) Notice: Subject to any disclaimer, the term of this patent is extended or adjusted under 35 U.S.C. 154(b) by 27 days.

(21) Appl. No.: 15/072,923

(22) Filed: Mar. 17, 2016

(65) Prior Publication Data

US 2016/0193596 A1 Jul. 7, 2016

Related U.S. Application Data

(63) Continuation of application No. PCT/JP2014/074534, filed on Sep. 17, 2014.

(30) Foreign Application Priority Data

Sep. 18, 2013 (JP) .................................. 2013-192905
Feb. 19, 2014 (JP) .................................. 2014-029819

(51) Int. Cl.
*B01J 35/00* (2006.01)
*B01J 27/24* (2006.01)
(Continued)

(52) U.S. Cl.
CPC .............. *B01J 35/004* (2013.01); *B01J 23/20* (2013.01); *B01J 23/75* (2013.01); *B01J 27/24* (2013.01);
(Continued)

(58) Field of Classification Search
None
See application file for complete search history.

(56) References Cited

U.S. PATENT DOCUMENTS

| 6,878,666 | B2* | 4/2005 | Domen | B01J 23/02 501/96.1 |
| 2003/0134745 | A1* | 7/2003 | Park | B01D 53/9422 502/352 |

(Continued)

FOREIGN PATENT DOCUMENTS

| JP | 2013-230427 A | 11/2013 | |
| WO | WO 2007052512 A1 * | 5/2007 | ............. B01J 23/62 |
| WO | WO 2012157193 A1 * | 11/2012 | ............. C25B 1/003 |

OTHER PUBLICATIONS

Hisatomi et al. "Photocatalytic oxygen evolution using BaNbO2N modified with cobalt oxide under photoexcitation up to 740nm", Energy & Environmental Science, 2013, 6, pp. 3595-3599.
(Continued)

*Primary Examiner* — Melvin C. Mayes
*Assistant Examiner* — Stefanie J Cohen
(74) *Attorney, Agent, or Firm* — Birch, Stewart, Kolasch & Birch, LLP (57) ABSTRACT

The present invention provides a photocatalyst for water splitting which includes barium niobium oxynitride and
(Continued)

exhibits excellent water splitting performance and a production method for the same, and a water splitting photoelectrode. The photocatalyst for water splitting of the present invention is a photocatalyst for water splitting including: an optical semiconductor and a promoter supported by the optical semiconductor, in which the optical semiconductor includes barium niobium oxynitride, and the promoter includes at least one substance selected from a group consisting of cobalt oxides and metallic cobalt.

9 Claims, 1 Drawing Sheet (51) Int. Cl.
    *C01B 3/04*         (2006.01)
    *C23C 8/24*         (2006.01)
    *B01J 23/20*       (2006.01)
    *B01J 23/75*       (2006.01)
    *B01J 37/04*       (2006.01)
    *B01J 37/08*       (2006.01)
    *C01B 13/02*      (2006.01)

(52) U.S. Cl.
    CPC ............. *B01J 35/002* (2013.01); *B01J 37/04* (2013.01); *B01J 37/08* (2013.01); *C01B 3/04* (2013.01); *C01B 3/042* (2013.01); *C01B 13/0207* (2013.01); *C23C 8/24* (2013.01); *Y02E 60/364* (2013.01)

(56) References Cited

U.S. PATENT DOCUMENTS

| | | | |
|---|---|---|---|
| 2012/0329644 A1* | 12/2012 | Siclovan | B01J 23/66 502/243 |
| 2014/0004435 A1* | 1/2014 | Tamura | C25B 1/003 429/422 |

OTHER PUBLICATIONS

Hisatomi et al., "The Effects of Preparation Conditions for a BaNbO2N Photocatalyst on its Physical Properties", ChemSusChem, 2014, 7, pp. 2016-2021.

International Search Report for PCT/JP2014/074534 (PCT/ISA/210) dated Dec. 9, 2014.

Siritanaratkul et al., "Synthesis and Photocatalytic Activity of Perovskite Niobium Oxynitrides with Wide Visible-Light Absorption Bands", ChemSusChem, 2011, 4, pp. 74-78.

Written Opinion of the International Searching Authority for PCT/JP2014/074534 (PCT/ISA/237) dated Dec. 9, 2014.

International Preliminary Report on Patentability and Written Opinion of the International Searching Authority (Forms PCT/IB/338, PCT/IB/373 and PCT/ISA/237) dated Mar. 31, 2016, for International Application No. PCT/JP2014/074534.

* cited by examiner

PHOTOCATALYST FOR WATER SPLITTING, PRODUCTION METHOD FOR SAME, AND PHOTOELECTRODE FOR WATER SPLITTING

CROSS-REFERENCE TO RELATED APPLICATIONS

This application is a Continuation of PCT International Application No. PCT/JP2014/074534 filed on Sep. 17, 2014, which claims priority under 35 U.S.C. § 119(a) to Japanese Patent Application No. 2013-192905 filed on Sep. 18, 2013 and Japanese Patent Application No. 2014-029819 filed on Feb. 19, 2014. Each of the above applications is hereby expressly incorporated by reference, in its entirety, into the present application.

BACKGROUND OF THE INVENTION

1. Field of the Invention

The present invention relates to a photocatalyst for water splitting and a production method for the same, and a photoelectrode for water splitting.

2. Description of the Related Art

From the viewpoint of carbon dioxide emission reduction and use of clean energy, a technique for producing hydrogen or oxygen by decomposing water with a photocatalyst using solar energy is attracting attention.

A number of studies are underway regarding a water splitting reaction in which a photocatalyst is used and, for example, ChemSusChem, 2011, 4, 74 to 78 discloses a photocatalyst for water splitting including a niobium atom. In addition, ChemSusChem, 2011, 4, 74 to 78 clarifies that, in a case in which barium niobium oxynitride is used, no catalytic activities are exhibited with respect to a water splitting reaction.

SUMMARY OF THE INVENTION

Meanwhile, since barium niobium oxynitride has an absorption edge at approximately 740 nm, barium niobium oxynitride is capable of efficiently absorbing light with a long wavelength, and there is a possibility that a catalyst exhibiting a higher catalytic activity than a photocatalyst for water splitting of the related art can be developed.

The present invention has been made in consideration of the above-described circumstance, and an object of the present invention is to provide a photocatalyst for water splitting which includes barium niobium oxynitride and exhibits excellent water splitting performance and a production method for the same.

In addition, another object of the present invention is to provide a photoelectrode for water splitting including the photocatalyst for water splitting.

The present inventors carried out intensive studies regarding the problem of the related art and consequently found that, when a predetermined promoter is supported by barium niobium oxynitride, the above-described problem can be solved.

That is, the present inventors found that the above-described problem can be solved using the following constitutions.

(1) A photocatalyst for water splitting including: an optical semiconductor and a promoter supported by the optical semiconductor, in which the optical semiconductor includes barium niobium oxynitride, and the promoter includes at least one substance selected from a group consisting of cobalt oxides and metallic cobalt.

(2) The photocatalyst for water splitting according to (1), in which an amount of the promoter supported is in a range of 0.001 parts by mass to 20 parts by mass with respect to 100 parts by mass of the optical semiconductor.

(3) A production method for the photocatalyst for water splitting according to (1) or (2), including: a step A of mixing barium niobium oxynitride and a cobalt compound and carrying out a heating treatment on an obtained mixture in an atmosphere in which barium niobium oxynitride is not oxidized.

(4) The production method for the photocatalyst for water splitting according to (3), further including, prior to the step A: a step B of mixing an oxide including a barium atom and a niobium atom and a compound which is different from the oxide, includes a barium atom, and may include a niobium atom so that a ratio (Ba molar amount/Nb molar amount) of a total molar amount (the Ba molar amount) of the barium atom derived from the oxide and the barium atom derived from the compound to a total molar amount (the Nb molar amount) of the niobium atom derived from the oxide and the niobium atom derived from the compound falls in a range of 1.3 to 4.0 and carrying out a nitriding treatment on an obtained mixture, thereby obtaining barium niobium oxynitride.

(5) The production method for the photocatalyst for water splitting according to (4), in which the compound which includes a barium atom and may include a niobium atom includes at least one substance selected from a group consisting of barium carbonate and barium nitrate.

(6) The production method for the photocatalyst for water splitting according to (3), further including, prior to the step A: a step C of forming an oxide including a barium atom and a niobium atom by means of a polymerized complex method using a compound including a barium atom, a compound including a niobium atom, and a raw material including a complexing agent and a step D of carrying out a nitriding treatment on the oxide, thereby obtaining barium niobium oxynitride.

(7) The production method for the photocatalyst for water splitting according to (6), in which the step C is a step of forming an oxide including a barium atom and a niobium atom by carrying out a heating treatment on a mixture including a compound including a barium atom, a compound including a niobium atom, and a complexing agent, and a molar amount of the barium atom derived from the compound including a barium atom is larger than a molar amount of the niobium atom derived from the compound including a niobium atom.

(8) The production method for the photocatalyst for water splitting according to any one of (3) to (7), in which the cobalt compound includes at least one substance selected from a group consisting of cobalt nitrate and cobaltammine complexes.

(9) A water splitting photoelectrode including: a support and a photocatalyst layer including a photocatalyst for water splitting according to (1) or (2) disposed on the support.

According to the present invention, it is possible to provide a photocatalyst for water splitting which includes barium niobium oxynitride and exhibits excellent water splitting performance and a production method for the same.

In addition, according to the present invention, it is possible to provide a water splitting photoelectrode including the photocatalyst for water splitting.

DESCRIPTION OF THE PREFERRED EMBODIMENTS

Hereinafter, preferred aspects of a photocatalyst for water splitting and a production method for the same, and a water splitting photoelectrode of the present invention will be described. Meanwhile, in the present specification, numerical ranges expressed using "to" include numerical values before and after the "to" as the lower limit value and the upper limit value.

First, characteristics of the present invention compared with the related art will be described in detail.

One of the characteristics of the present invention is that a promotor including at least one substance selected from a group consisting of cobalt oxides and metallic cobalt is supported by barium niobium oxynitride. It has been confirmed that, when a specific promotor as described above is supported, excellent water splitting performance (particularly, an oxygen generation capability) is exhibited.

Hereinafter, first, the constitution of the photocatalyst for water splitting will be described in detail, and then the production method for the photocatalyst for water splitting and the water splitting photoelectrode obtained using the photocatalyst for water splitting will be described in detail.

<Photocatalyst for Water Splitting>

The photocatalyst for water splitting of the present invention is a catalyst including an optical semiconductor and a promoter supported by the optical semiconductor, in which the optical semiconductor includes barium niobium oxynitride, and the promoter includes at least one substance selected from a group consisting of cobalt oxides and metallic cobalt. The photocatalyst for water splitting of the present invention exhibits excellent oxygen generation capability and hydrogen generation capability.

Hereinafter, first, components included in the photocatalyst for water splitting will be described in detail.

(Optical Semiconductor)

The photocatalyst for water splitting of the present invention includes barium niobium oxynitride as the optical semiconductor. As described above, barium niobium oxynitride has an absorption edge in a long wavelength range (740 nm), and thus is capable of efficiently absorbing not only light with a short wavelength but also light with a long wavelength.

Barium niobium oxynitride refers to an oxinitride including a barium atom (Ba) and a niobium atom (Nb) and, more specifically, is a compound represented by $BaNbO_2N$.

Meanwhile, in the present invention, barium niobium oxynitride is not limited to the compositional ratio of the above-described chemical formula, and aspects deviated from the stoichiometric ratio such as barium niobium oxynitride having a defect structure in which a portion of barium atoms are missing and barium niobium oxynitride in which a portion of niobium atoms are reduced are also included in the scope of the barium niobium oxynitride.

In addition, in the present invention, aspects in which the atomic proportion between an oxygen atom and a nitrogen atom is deviated from the stoichiometric ratio are also included in the scope of barium niobium oxynitride, and more specifically, the ratio of % by atom of an oxygen atom to % by atom of a nitrogen atom (% by atom of an oxygen atom/% by atom of a nitrogen atom) in barium niobium oxynitride is preferably in a range of 1.5 to 8.5 and more preferably in a range of 1.8 to 3.0. Meanwhile, the ratio is measured using an oxygen and nitrogen analyzer (EMGA-620W) (Horiba Ltd.).

The size (average particle diameter) of barium niobium oxynitride is not particularly limited; however, from the viewpoint of superior water splitting performance of the photocatalyst for water splitting, the size thereof is preferably in a range of 0.1 μm to 5.0 μm and more preferably in a range of 0.5 μm to 2.0 μm. When the size thereof is 0.1 μm or larger, crystallinity improves, and furthermore, a sufficiently thick depletion layer is generated, and thus the efficiency as a catalyst increases. When the size thereof is 5.0 μm or smaller, the distance that electrons or holes generated by means of excitation migrate is relatively short, and the efficiency as a catalyst does not easily decrease.

Meanwhile, the above-described average particle diameter refers to a value obtained by measuring the particle diameters (diameters) of at least 300 barium niobium oxynitride particles using an electron microscope (for example, a scanning electron microscope) and arithmetically averaging the particle diameters. Specifically, the average particle diameter is obtained by binarizing a SEM image and approximating the image to a spherical form using imaging software (image analysis software WinRoof manufactured by Mitani Corporation). For the SEM measurement, a SU-8020 SEM manufactured by Hitachi High-Technologies Corporation is used. An accelerating voltage of 3 kV, a magnification of 25,000 times, and an image of 1195×896 pixels are used. Meanwhile, in a case in which the shape of barium niobium oxynitride is not truly spherical, an equivalent circle is used. The "equivalent circle diameter" refers to the diameter of a circle imaged to have the same projected area as the projected area of barium niobium oxynitride during observation.

Meanwhile, in the optical semiconductor, barium niobium oxynitride preferably constitutes the main component. Here, the main component means that the content of barium niobium oxynitride is 60% by mass or higher of the total mass of the optical semiconductor, and, from the viewpoint of a superior water splitting capability of the photocatalyst for water splitting, the content thereof is preferably 80% by mass or higher. The upper limit thereof is not particularly limited and is 100% by mass.

As the optical semiconductor, the photocatalyst for water splitting may include an optical semiconductor other than barium niobium oxynitride as long as the effect of the present invention is not impaired.

(Promoter)

The photocatalyst for water splitting of the present invention includes at least one substance selected from a group consisting of cobalt oxides and metallic cobalt as the promoter. Meanwhile, in the following, both components will also be collectively referred to as the "cobalt component".

Cobalt oxide refers to an oxide of cobalt, and examples thereof include cobalt oxides represented by $CoO_x$ (x is preferably in a range of 0.5 to 1.5 and more preferably in a range of 1.0 to 1.4), and more specific examples thereof include $CoO$ and $Co_3O_4$. The metallic cobalt refers to a metal represented by Co.

As the promoter, only any one of a cobalt oxide and metallic cobalt may be used or both may be jointly used.

Meanwhile, the promoter may have a core shell structure of metallic cobalt and a cobalt oxide. More specifically, the promoter may have a core shell structure in which metallic cobalt constitutes a core portion and a cobalt oxide constitutes a shell portion.

The shape of the cobalt component which is the promoter is not particularly limited, but is preferably a spherical shape since the surface area is larger.

The size (average particle diameter) of the cobalt component (metallic cobalt and a cobalt oxide) is not particularly limited; however, from the viewpoint of superior water splitting performance of the photocatalyst for water splitting, the size thereof is preferably in a range of 1 nm to 50 nm and more preferably in a range of 2 nm to 20 nm.

Meanwhile, the above-described average particle diameter refers to a value obtained by confirming the shape of the promoter using an electron microscope (scanning electron microscope), then, measuring the particle diameters (diameters) of at least 500 cobalt component particles using an electron microscope (scanning electron microscope), and arithmetically averaging the particle diameters. Meanwhile, in a case in which the shape of the cobalt component is not truly spherical, an equivalent circle is used. Specifically, the average particle diameter is obtained by binarizing a SEM image and approximating the image to a spherical form using imaging software (image analysis software WinRoof manufactured by Mitani Corporation). For the SEM measurement, a Hitachi ultrahigh-resolution electric field emission scanning electron microscope SU8020 manufactured by Hitachi High-Technologies Corporation is used. An accelerating voltage of 15 kV, a magnification of 2,000,000 times, and an image of 1195×896 pixels are used.

The amount of the promoter supported by the optical semiconductor is not particularly limited; however, from the viewpoint of superior water splitting performance of the photocatalyst for water splitting, the amount thereof is preferably in a range of 0.001 parts by mass to 20 parts by mass and more preferably in a range of 0.001 parts by mass to 10 parts by mass with respect to 100 parts by mass of the optical semiconductor.

Meanwhile, in the promoter, the cobalt component preferably constitutes the main component. Here, the main component means that the content of the cobalt component (the total amount of a cobalt oxide and metallic cobalt) is 70% by mass or higher of the total mass of the promoter, and, from the viewpoint of superior water splitting performance of the photocatalyst for water splitting, the content thereof is preferably 80% by mass or higher. The upper limit thereof is not particularly limited and is 100% by mass.

As the promoter, the photocatalyst for water splitting may include a promoter other than the cobalt component as long as the effect of the present invention is not impaired.

<Production Method for Photocatalyst for Water Splitting>

A production method for the above-described photocatalyst for water splitting is not particularly limited, and a well-known method can be employed. Examples thereof include a method in which a solution including a cobalt compound (a compound including a cobalt atom) which serves as the promoter and barium niobium oxynitride are brought into contact with each other and then are heated as necessary and a method in which a cobalt compound is sublimated so as to be supported on barium niobium oxynitride.

Among these, a step A of mixing barium niobium oxynitride and a cobalt compound and carrying out a heating treatment on the obtained mixture in an atmosphere in which barium niobium oxynitride is not oxidized is preferred since it is easier to control the supporting amount.

Hereinafter, the step A will be described in detail.

Barium niobium oxynitride used in the step A is as described above.

The cobalt compound refers to a compound including a cobalt atom and is a precursor of the promoter. The cobalt compound is not particularly limited as long as the cobalt compound includes a cobalt atom and can become a cobalt oxide or metallic cobalt. Example thereof include salts including a cobalt atom (for example, nitrate, carbonate, carboxylate, sulfate, phosphate, sulfonate, borate, and the like), complexes including a cobalt atom (for example, acetylacetonate, thiolate, thiocarboxylate complexes, ammine complexes, a variety of amine complexes, porphyrin complexes, a variety of nitrile complexes, and the like), cobalt hydroxide, halogenated cobalt, cobalt oxides, and metallic cobalt. Among these, cobalt nitrate or a cobalt ammine complex is preferred from the viewpoint of thermal decomposition properties.

A mixing method of barium niobium oxynitride and the cobalt compound is not particularly limited, and examples thereof include a method in which a solution in which barium niobium oxynitride is dispersed and a solution including the cobalt compound are mixed together and a method in which barium niobium oxynitride and the cobalt compound are added to a solvent and are mixed together. Additional examples thereof include a photodeposition method (for example, barium niobium oxynitride is suspended in an aqueous solution including cobalt ions, and the solution is irradiated with light rays in an ultraviolet to visible light range, thereby supporting the promoter including the cobalt component on barium niobium oxynitride), an electrocrystallization method (for example, an electrode including barium niobium oxynitride disposed on the surface is immersed in an aqueous solution including cobalt ions and a predetermined potential is applied thereto, thereby supporting a promoter including the cobalt component on barium niobium oxynitride), and an immersion method (for example, a supporter or powder including barium niobium oxynitride disposed on the surface is immersed in an aqueous solution including cobalt ions for a predetermined period of time, and a firing treatment is carried out as necessary, thereby supporting a promoter including the cobalt component on barium niobium oxynitride).

Meanwhile, after the mixture, if necessary, a drying treatment may be carried out. When the drying treatment is carried out, it is possible to remove a volatile component such as a solvent from the mixture of barium niobium oxynitride and the cobalt compound.

Next, a heating treatment is carried out on the obtained mixture of barium niobium oxynitride and the cobalt compound in an atmosphere in which barium niobium oxynitride is not oxidized. When the present treatment is carried out, a predetermined photocatalyst for water splitting can be obtained.

Examples of the atmosphere in which barium niobium oxynitride is not oxidized include a so-called reducing atmosphere, an inert atmosphere ($N_2$, Ar, or He), and a vacuum. The reducing atmosphere refers to an atmosphere including a reducing gas, and examples of the reducing gas include ammonia. Meanwhile, the atmosphere in which barium niobium oxynitride is not oxidized may be in the presence of oxygen under conditions in which the temperature of the heating treatment is a low temperature (200° C. or lower).

The conditions of the heating treatment are not particularly limited, and optimal conditions are more appropriately selected depending on the kind and the like of the cobalt compound being used. Among these, since the water splitting performance of the photocatalyst for water splitting is superior, the heating temperature is preferably in a range of 200° C. to 700° C. and more preferably in a range of 400° C. to 600° C., and the heating duration is preferably in a range of 0.5 hours to 10 hours and more preferably in a range of 0.5 hours to 1 hour.

As one of preferred aspects of the production method for the photocatalyst for water splitting, a step of obtaining barium niobium oxynitride by means of a predetermined step (step B, step C and step D, or step E all of which will be described below) is preferably carried out prior to the step A.

Hereinafter, the order of the step B and the step C will be described in detail.

((First) Preferred Aspect)

One of the preferred aspects of the production method for the photocatalyst for water splitting is an aspect further including, prior to the step A, a step B of mixing an oxide including a barium atom and a niobium atom and a compound which is different from the oxide, includes a barium atom, and may include a niobium atom and carrying out a nitriding treatment on the mixture, thereby obtaining barium niobium oxynitride. Meanwhile, in the step B, the ratio (Ba molar amount/Nb molar amount) of the total molar amount (the Ba molar amount) of the barium atom derived from the oxide and the barium atom derived from the compound to the total molar amount (the Nb molar amount) of the niobium atom derived from the oxide and the niobium atom derived from the compound is adjusted to fall into a range of 1.3 to 4.0.

When barium niobium oxynitride is prepared, generally, there are many cases in which predetermined components are mixed together and the mixture is heated. Meanwhile, the niobium atom is relatively easily reduced, a reducing species of the niobium atom traps a carrier of a water splitting reaction, and thus the water splitting performance deteriorates. In addition, during the heating treatment, the barium atom is likely to disappear, which also deteriorates the water splitting performance. Therefore, when the molar ratio between the barium atom and the niobium atom in the reaction system is made to fall into a predetermined range by adding a predetermined compound to an oxide including a barium atom and a niobium atom as described above, it is possible to obtain barium niobium oxynitride in which generation of the above-described defect is suppressed, and consequently, the water splitting performance of the photocatalyst for water splitting to be obtained is superior.

Hereinafter, materials used in the step B and the order thereof will be described in detail.

The oxide including a barium atom and a niobium atom (hereinafter, also referred to as the oxide A) is a precursor of the above-described barium niobium oxynitride. The oxide may be any oxide as long as the oxide includes a barium atom, a niobium atom, and an oxygen atom, and examples thereof include $BaNb_2O_6$, $Ba_5Nb_4O_{15}$, and $Ba_4Nb_6O_{19}$.

Meanwhile, the structure of the oxide may be crystalline or amorphous.

In addition, the production method of the oxide is not particularly limited, and a well-known method (for example, a flux method, a solid-phase method, a polymerized complex method, or a sol-gel method) can be employed.

The compound which is different from the oxide, includes a barium atom, and may include a niobium atom (hereinafter, also referred to as the compound X) is a compound which is different from the above-described oxide and includes a predetermined atom. Meanwhile, the compound X may include an oxygen atom. That is, the compound may be an oxide. Examples of the compound X include compounds including a barium atom (but not including a niobium atom) (hereinafter, also referred to as the compound Y) and oxides which include a barium atom and a niobium atom and in which the ratio B of the molar amount of the barium atom and the molar amount of the niobium atom (the molar amount of the barium atom/the molar amount of the niobium atom) is greater than the ratio A of the molar amount of the barium atom and the molar amount of the niobium atom (the molar amount of the barium atom/the molar amount of the niobium atom) in the oxide A (hereinafter, the oxide B).

The compound including a barium atom (the compound Y) is a compound that is jointly used with the above-described oxide and may include a barium atom. This compound preferably does not include a niobium atom and only includes a barium atom as a metal atom. Examples of this compound include oxoacid salts including a barium atom (for example, nitrate, carbonate, carboxylate, sulfate, and phosphate), complexes including a barium atom (for example, acetyl acetonate and thiolate), barium hydroxides, and barium oxides. The compound is not limited to the above-described compounds as long as a compound is thermally decomposed. Among these, barium carbonate or barium nitrate is preferred since handling properties are excellent, and a residue after thermal decomposition does not easily remain.

The oxide B includes a barium atom and a niobium atom, but the ratio B of the molar amount of the barium atom and the molar amount of the niobium atom (the molar amount of the barium atom/the molar amount of the niobium atom) is greater than the ratio A of the molar amount of the barium atom and the molar amount of the niobium atom (the molar amount of the barium atom/the molar amount of the niobium atom) in the oxide A. That is, the oxide B includes a larger amount of a barium atom than the oxide A.

Examples of a combination of the oxide A and the oxide B include an aspect in which the oxide A is $BaNb_2O_6$ and the oxide B is $Ba_5Nb_4O_{15}$.

The oxide A including a barium atom and a niobium atom and the compound X are preferably mixed together so as to obtain a predetermined mixing ratio. Specifically, in terms of superior water splitting performance of the photocatalyst for water splitting, the ratio (Ba molar amount/Nb molar amount) of the total molar amount (the Ba molar amount) of the barium atom derived from the oxide and the barium atom derived from the compound (the compound X) to the total molar amount (the Nb molar amount) of the niobium atom derived from the oxide and the niobium atom derived from the compound (the compound X) is preferably adjusted to fall in a range of 1.3 to 4.0, more preferably adjusted to fall in a range of 1.35 to 3.5, and still more preferably adjusted to fall in a range of 1.5 to 2.0. Meanwhile, in a case in which the compound X does not include a niobium atom, the molar amount of the niobium atom derived from the compound X is considered to be zero in computation.

A mixing method of the oxide A and the compound X is not particularly limited, and examples thereof include a method in which a solution including the oxide A and a solution including the compound X are mixed together and a method in which the oxide A and the compound X are added to a predetermined solvent.

Meanwhile, after the oxide A and the compound X are mixed together, a drying treatment may be carried out as necessary. When the drying treatment is carried out, it is possible to remove a volatile component such as a solvent from the mixture of the oxide A and the compound X.

Next, a nitriding treatment is carried out on the obtained mixture, thereby obtaining barium niobium oxynitride.

A method for the nitriding treatment is not particularly limited, and generally, a heating treatment is carried out in an atmosphere of a gas including a nitrogen atom. Examples of the gas including a nitrogen atom include ammonia, nitrogen, and hydrazine.

The supply amount of the gas including a nitrogen atom is not particularly limited; however, in terms of superior water splitting performance of the photocatalyst for water splitting, the ratio of the supply amount of the gas including a nitrogen atom to the mass (g) of the mixture (the supply amount (ml/min) of the gas/the mass (g) of the mixture) (hereinafter, also referred to as the ratio Z) is preferably in a range of 10 to 1500 and more preferably in a range of 100 to 350.

Conditions for the heating treatment are not particularly limited, and optimal conditions are appropriately selected depending on the kind of the compound X to be used. Among these, in terms of superior water splitting performance of the photocatalyst for water slitting, the heating temperature is preferably in a range of 800° C. to 1050° C. and more preferably in a range of 850° C. to 1000° C. The heating duration is preferably in a range of 5 hours to 80 hours, more preferably in a range of 10 hours to 70 hours, and still more preferably in a range of 40 hours to 60 hours.

Meanwhile, after the nitriding treatment, a treatment for washing barium niobium oxynitride may be carried out as necessary. Examples of a solvent used for the washing include aqua regalis, nitric acid, and hydrochloric acid.

Meanwhile, in the step B, barium niobium oxynitride is produced using a mixture obtained by mixing the oxide A and the compound X; however, as another production method of barium niobium oxynitride, barium niobium oxynitride may be produced by carrying out the nitriding treatment on the oxide A. In this case, the ratio of the supply amount of the gas including a nitrogen atom to the mass (g) of the oxide A (the supply amount (ml/min) of the gas/the mass (g) of the mixture) is preferably in the range of the ratio Z.

((Second) Preferred Aspect)

One of the preferred aspects of the production method for the photocatalyst for water splitting is an aspect further including, prior to the step A, a step C of forming an oxide including a barium atom and a niobium atom by means of a polymerized complex method using a compound including a barium atom, a compound including a niobium atom, and a raw material including a complexing agent and a step D of carrying out a nitriding treatment on the oxide, thereby obtaining barium niobium oxynitride.

In a case in which the polymerized complex method is carried out, it is possible to dispose the barium atom and the niobium atom in near a predetermined amount in a complex to be formed, and thus the control of the supply amount of the barium atom and the niobium atom is easy, and consequently, the water splitting performance of a photocatalyst for water splitting to be obtained is superior.

First, hereinafter, materials used in the step C will be described in detail.

The compound including a barium atom may be any compound as long as the compound includes a barium atom, and examples thereof include compounds exemplified by the above-described compound Y. Meanwhile, the compound including a barium atom is preferably a compound that can be dissolved in a solvent described below.

In addition, the compound including a niobium atom may be any compound as long as the compound includes a niobium atom, and examples thereof include compounds including a pentavalent niobium atom (for example, halogenated niobium and niobium alkoxide). Meanwhile, the compound including a niobium atom is preferably a compound that can be dissolved in a solvent described below.

The compound including a barium atom and the compound including a niobium atom are jointly used and are used as a raw material A. The mixing amount of the compound including a barium atom and the compound including a niobium atom in the raw material A is not particularly limited; however, in terms of superior water splitting performance of the photocatalyst for water splitting, the molar amount of the barium atom derived from the compound including a barium atom (the molar amount X) is greater than the molar amount of the niobium atom derived from the compound including a niobium atom (molar amount Y), and the ratio between both amounts (the molar amount X/the molar amount Y) is preferably in a range of 1.10 to 4.00, more preferably in a range of 1.25 to 3.00, and still more preferably in a range of 1.75 to 2.50.

A complexing agent is not particularly limited as long as the complexing agent is a compound capable of forming a complex with the niobium atom or the like, and preferred examples of one of the preferred aspects of the complexing agent include compounds having a carboxyl group. More specific examples thereof include at least one selected from a group consisting of oxalic acid, malic acid, acidum tartaricum, citric acid, succinic acid, maleic acid, acetic acid, and malonic acid. In addition, additional preferred examples of one of the preferred aspects of the complexing agent include compounds having a functional group capable of forming an ester bond with a carboxyl group in the compound having a carboxyl group, and this compound is more preferably a compound having two or more hydroxyl groups (OH groups) in the molecule. For example, it is possible to use ethylene glycol, propylene glycol, diethylene glycol, catechin, glycerin, polyvinyl alcohol, or the like, and it is more preferable to use ethylene glycol. That is, an aspect in which, as the complexing agent, the compound having a carboxyl group and a compound having a hydroxyl group are jointly used is preferred.

The content of the complexing agent in the raw material A is not particularly limited; however, in terms of superior water splitting performance of the photocatalyst for water splitting to be obtained, the ratio (the molar amount of the complexing agent/the total molar amount of the molar amount X and the molar amount Y) of the molar amount of the complexing agent to the total molar amount of the molar amount of the barium atom derived from the compound including a barium atom (the molar amount X) and the molar amount of the niobium atom derived from the compound including a niobium atom (the molar amount Y) is preferably in a range of 5 to 100 and more preferably in a range of 20 to 50.

Meanwhile, the raw material may include components other than the above-described components (the compound including a barium atom, the compound including a niobium atom, and the complexing agent).

For example, the raw material may further include a compound including both a barium atom and a niobium atom. The above-described compound may further include an oxygen atom, and more specific examples thereof include $Ba_4Nb_6O_{19}$.

In addition, the raw material may include a solvent. The kind of the solvent is not particularly limited, and examples thereof include water and organic solvents (for example, alcohol-based solvents).

The polymerized complex method refers to a method in which a metallic complex is produced using a predetermined raw material, the metallic complex is heated and polymerized so as to produce a precursor, and the precursor is further heated, thereby obtaining a desired oxide (an oxide including a barium atom and a niobium atom). For example, the compound including a barium atom, the compound including a niobium atom, and the complexing agent such as citric acid or ethylene glycol are mixed together, thereby obtaining a metallic citric acid complex.

After that, the metallic citric acid complex is polymerized using an ester bond by increasing the temperature to the polymerization temperature so as to obtain a gel, and the obtained gel is thermally decomposed by being heated to a thermal decomposition temperature (for example, 300° C. to 500° C.), thereby obtaining a precursor. Furthermore, the precursor is fired in the presence of oxygen such as in the air at a temperature in a range of 600° C. to 1000° C. and preferably in a range of 700° C. to 900° C. for three hours or longer and preferably for five hours or longer, whereby an oxide can be obtained.

The heating conditions in the polymerized complex method are not particularly limited, and optimal conditions are appropriately selected depending on materials to be used, and an aspect including a first heating step of heating the precursor at a temperature in a range of 300° C. to 500° C. and a second heating step of heating the precursor at a temperature in a range of 600° C. to 1000° C. is preferred. The treatment duration of the first heating step is not particularly limited; however, generally, is preferably in a range of 0.5 hours to 2 hours. The treatment duration of the second heating step is not particularly limited; however, generally, is preferably in a range of 5 hours to 10 hours.

In addition, an apparatus used during the heating treatment is not particularly limited; however, in terms of superior water splitting performance of the photocatalyst for water splitting, it is preferable to carry out the heating treatment using a rotary kiln. When the precursor is heated in a rotary kiln, the heating treatment is uniformly carried out on the metallic complex, and fluctuation is not easily caused.

Meanwhile, an oxide to be obtained may be any oxide as long as the oxide includes a barium atom, a niobium atom, and an oxygen atom, and examples thereof include $BaNb_2O_6$ and $Ba_5Nb_4O_{15}$. Meanwhile, the structure of the oxide may be crystalline or amorphous.

Next, a nitriding treatment is carried out on the obtained oxide, and barium niobium oxynitride can be obtained (Step D). The order and conditions of the nitriding treatment are not particularly limited, and examples thereof include those of the nitriding treatment carried out in the above-described (first) preferred aspect. Regarding the conditions for the nitriding treatment in this case, the ratio of the supply amount of the gas including a nitrogen atom to the mass (g) of the mixture (the supply amount (ml/min) of the gas/the mass (g) of the mixture) is preferably in the range of the ratio Z.

Meanwhile, during the nitriding treatment, if necessary, it is also possible to further use a compound including a barium atom together with the above-described oxide and carry out the nitriding treatment on the mixture of the oxide and the compound including a barium atom. When the compound including a barium atom is separated added thereto, the amount of the barium atom in barium niobium oxynitride can be appropriately adjusted. Meanwhile, examples of the compound including a barium atom include the compounds exemplified by the above-described compound Y.

((Third) Preferred Aspect)

One of the preferred aspects of the production method for the photocatalyst for water splitting is an aspect further including, prior to the step A, a step E of mixing a compound including a barium atom and a compound including a niobium atom and carrying out a riding treatment on the mixture, thereby obtaining barium niobium oxynitride.

The step E is an aspect in which a nitriding treatment is directly carried out on a mixture including a compound including a barium atom and a compound including a niobium atom, thereby obtaining barium niobium oxynitride.

Examples of the compound including a barium atom being used include the compound including a barium atom which is used in the step B (the compound Y).

In addition, the compound including a niobium atom being used may be any compound as long as the compound includes a niobium atom, and examples thereof include compounds including a pentavalent niobium atom (for example, niobium oxide, halogenated niobium, and niobium alkoxide).

Conditions for the nitriding treatment are the same as the conditions in the step B. Regarding the conditions for the nitriding treatment in this case, the ratio of the supply amount of the gas including a nitrogen atom to the mass (g) of the mixture (the supply amount (ml/min) of the gas/the mass (g) of the mixture) is preferably in the range of the ratio Z.

((Fourth) Preferred Aspect)

One of the preferred aspects of the production method for the photocatalyst for water splitting is an aspect further including, after the step A, a step F of carrying out a heating treatment in an oxidative atmosphere. When the step F is carried out, the metallic cobalt generated by means of the step A is more efficiently oxidized, and consequently, the water splitting performance of the photocatalyst for water splitting is superior.

The oxidative atmosphere refers to an atmosphere including oxygen and may be in the air.

Conditions for the heating treatment are not particularly limited, and optimal conditions are appropriately selected depending on the kind and the like of the cobalt compound to be used. Among these, in terms of superior water splitting performance of the photocatalyst for water splitting and preventing the composition of oxynitride from being affected, the heating temperature is preferably in a range of 50° C. to 300° C. and more preferably in a range of 60° C. to 200° C., and the heating duration is preferably in a range of 0.5 hours to 3 hours, and more preferably in a range of 0.5 hours to 1.5 hours.

A water splitting reaction in which the photocatalyst for water splitting of the present invention is used can be performed using an arbitrary method well known to a person skilled in the art.

For example, it is possible to use the photocatalyst for water splitting of the present invention in a powder form, disperse the photocatalyst for water splitting in a solvent (for example, water), and irradiate water with light from a light source (for example, a Xe lamp) under stirring as necessary so as to decompose water, thereby generating hydrogen. In addition, it is also possible to produce the photocatalyst for water splitting of the present invention in a thin film shape, fix the thin film onto a support so as to produce a water splitting photoelectrode, dispose the water splitting photoelectrode in a solvent (for example, water) together with a platinum electrode or the like as a counter electrode, and irradiate the water splitting photoelectrode with light using a light source (for example, a Xenon lamp) so as to decompose water, thereby generating hydrogen.

Hereinafter, an aspect of the water splitting photoelectrode will be described in detail.

<Water Splitting Photoelectrode and Production Method for Same>

The water splitting photoelectrode of the present invention includes a support and a photocatalyst layer including the photocatalyst for water splitting disposed on the support.

The kind of the support being used is not particularly limited, and a well-known support can be used. In addition, as the support, a conductive support formed of a metal, a non-metal such as carbon (graphite), or a conductive material such as a conductive oxide is preferably used. Among these, a metal support is particularly preferably used due to its favorable workability. As the metal support, it is possible to use a single body of an atom exhibiting favorable electric conductivity or an alloy. Specific examples of the single body of an atom include Au, Ti, Zr, Nb, and Ta. Specific examples of the alloy include carbon steel and titanium alloys, but the alloy is not limited to the above-exemplified materials as long as an alloy is electrochemically stable.

The shape of the support is not particularly limited and may be a punching metal shape, a mesh shape, a lattice shape, or a porous body having penetrating fine pores.

In addition, the support may be a laminate of a plurality of layers (for example, a laminate of a glass substrate and a metal layer).

The photocatalyst layer refers to a layer including the above-described photocatalyst for water splitting.

The thickness of the photocatalyst layer is not particularly limited, but is preferably in a range of 0.1 µm to 3.0 µm and more preferably in a range of 0.5 µm to 2.0 µm in terms of superior water splitting performance of the water splitting photoelectrode.

A formation method for the photocatalyst layer is not particularly limited, and a well-known method can be employed. Examples thereof include the transfer method described in Chem. Sci., 2013, 4, 1120 to 1124.

When light is radiated from a light source to the above-described photocatalyst for water splitting or water splitting photoelectrode in a state of being in contact with water, it is possible to produce hydrogen and/or oxygen.

Conditions for the photoinduced water splitting reaction can be appropriately selected depending on a photocatalyst being used and are not particularly limited.

Meanwhile, the light source being used in the photoinduced water splitting reaction is not particularly limited, and it is possible to use not only sunlight but also an artificial light source such as a xenon lamp, a mercury lamp, a metal halide lamp, an LED lamp, or a solar simulator.

EXAMPLES

Hereinafter, the present invention will be described in more detail using examples, but the present invention is not limited thereto.

Example 1

(Preparation of $Ba_5Nb_4O_{15}$ (Flux Method))

$Nb_2O_5$ (2.66 g), $BaCO_3$ (4.93 g), and NaCl (2.34 g) were mixed together (Ba atom/Nb atom (molar ratio)=1.25, Na atom/Nb atom (molar ratio)=4), were fired at 900° C. for five hours, and were washed. Generation of the obtained $Ba_5Nb_4O_{15}$ was confirmed by means of X-ray diffraction (XRD).

(Preparation of Barium Niobium Oxynitride ($BaNbO_2N$))

A nitriding treatment was carried out on the obtained $Ba_5Nb_4O_{15}$ in an ammonia flow (200 ml/min) at 929° C. for 15 hours. After that, the surface of a product was washed with aqua regalis, thereby obtaining barium niobium oxynitride ($BaNbO_2N$). Generation of barium niobium oxynitride was confirmed by means of X-ray diffraction (XRD). In addition, it was confirmed by means of a diffuse reflection spectrum measurement that the absorption edge of barium niobium oxynitride was 740 nm. Meanwhile, the amount of $Ba_5Nb_4O_{15}$ used was 1.7 g.

(Support of Promoter)

A suspension liquid (solvent: $H_2O$) of barium niobium oxynitride obtained using a magnetic evaporating dish was produced, and an aqueous solution of cobalt nitrate was added to the suspension liquid so that $Co/BaNbO_2N$ reached 2% by mass in terms of the mass ratio. After that, the mixture was stirred using a glass rod while heating the magnetic evaporating dish with water vapor flying upwards from a beaker including boiled water.

The obtained powder was heated in an ammonia flow (200 ml/min) at 500° C. for one hour and was further heated in an oxygen atmosphere at 200° C. for one hour, thereby producing a photocatalyst for water slitting. The obtained photocatalyst for water splitting was observed using a SEM-EDX (instrument name: SU-8020, Hitachi High-Technologies Corporation) and a TEM (instrument name: H-8100, Hitachi High-Technologies Corporation) and consequently, it was confirmed that the promoter (cobalt oxide) was supported by barium niobium oxynitride.

Example 2

A photocatalyst for water splitting was produced according to the same order as in Example 1 except for the fact that, in the preparation of Example 1 (barium niobium oxynitride ($BaNbO_2N$)), $BaCO_3$ was added to $Ba_5Nb_4O_{15}$ so that Ba/Nb (molar ratio) reached 1.5, and then a nitriding treatment was carried out.

Meanwhile, Ba/Nb (molar ratio) refers to the molar ratio (Ba/Nb) of the total molar amount of a barium atom derived from $Ba_5Nb_4O_{15}$ and a barium atom derived from $BaCO_3$ to the molar amount of a niobium atom derived from $Ba_5Nb_4O_{15}$ (hereinafter, this shall apply to Examples 3, 5, 6, 8, and 9). In addition, the amount of $Ba_5Nb_4O_{15}$ used was 1.7 g (hereinafter, this shall apply to Examples 3, 5, 6, 8, and 9).

Example 3

A photocatalyst for water splitting was produced according to the same order as in Example 1 except for the fact that, in the preparation of Example 1 (barium niobium oxynitride ($BaNbO_2N$)), $BaCO_3$ was added to $Ba_5Nb_4O_{15}$ so that Ba/Nb (molar ratio) reached 1.75, and then a nitriding treatment was carried out.

Example 4

A photocatalyst for water splitting was produced according to the same order as in Example 1 except for the fact that the firing temperature was changed from 900° C. to 1000° C. in (the preparation of $Ba_5Nb_4O_{15}$ (the flux method)).

Example 5

A photocatalyst for water splitting was produced according to the same order as in Example 4 except for the fact that, in (the preparation of barium niobium oxynitride ($BaNbO_2N$)), $BaCO_3$ was added to $Ba_5Nb_4O_{15}$ so that Ba/Nb (molar ratio) reached 1.5, and then a nitriding treatment was carried out.

Example 6

A photocatalyst for water splitting was produced according to the same order as in Example 4 except for the fact that, in (the preparation of barium niobium oxynitride ($BaNbO_2N$)), $BaCO_3$ was added to $Ba_5Nb_4O_{15}$ so that Ba/Nb (molar ratio) reached 2, and then a nitriding treatment was carried out.

Example 7

A photocatalyst for water splitting was produced according to the same order as in Example 1 except for the fact that the firing condition was changed to "a nitriding treatment in an ammonia flow (500 ml/min) at 1000° C. for 20 hours" in (the preparation of barium niobium oxynitride ($BaNbO_2N$)).

Example 8

A photocatalyst for water splitting was produced according to the same order as in Example 7 except for the fact that, in (the preparation of barium niobium oxynitride ($BaNbO_2N$)), $BaCO_3$ was added to $Ba_5Nb_4O_{15}$ so that Ba/Nb (molar ratio) reached 1.5, and then a nitriding treatment was carried out.

Example 9

A photocatalyst for water splitting was produced according to the same order as in Example 7 except for the fact that, in (the preparation of barium niobium oxynitride ($BaNbO_2N$)), $BaCO_3$ was added to $Ba_5Nb_4O_{15}$ so that Ba/Nb (molar ratio) reached 2, and then a nitriding treatment was carried out.

Comparative Example 1

A photocatalyst for water splitting was produced according to the same order as in Example 1 except for the fact that the (support of the promoter) was not carried out.

The photocatalyst for water splitting obtained in Comparative Example 1 did not include any cobalt components.

Comparative Example 2

A photocatalyst for water splitting was produced according to the same order as in Example 1 except for the fact that $Ba_5Nb_4O_{15}$ was used instead of barium niobium oxynitride in the (support of the promoter).

Comparative Example 3

A photocatalyst for water splitting was produced according to the same order as in Example 1 except for the fact that an aqueous solution of tetraamminedichloroplatinum $Pt(NH_2)_4Cl_2$ was used instead of the aqueous solution of cobalt nitrate.

<Evaluation: Photoinduced Water Splitting Reaction>

Figure 1:
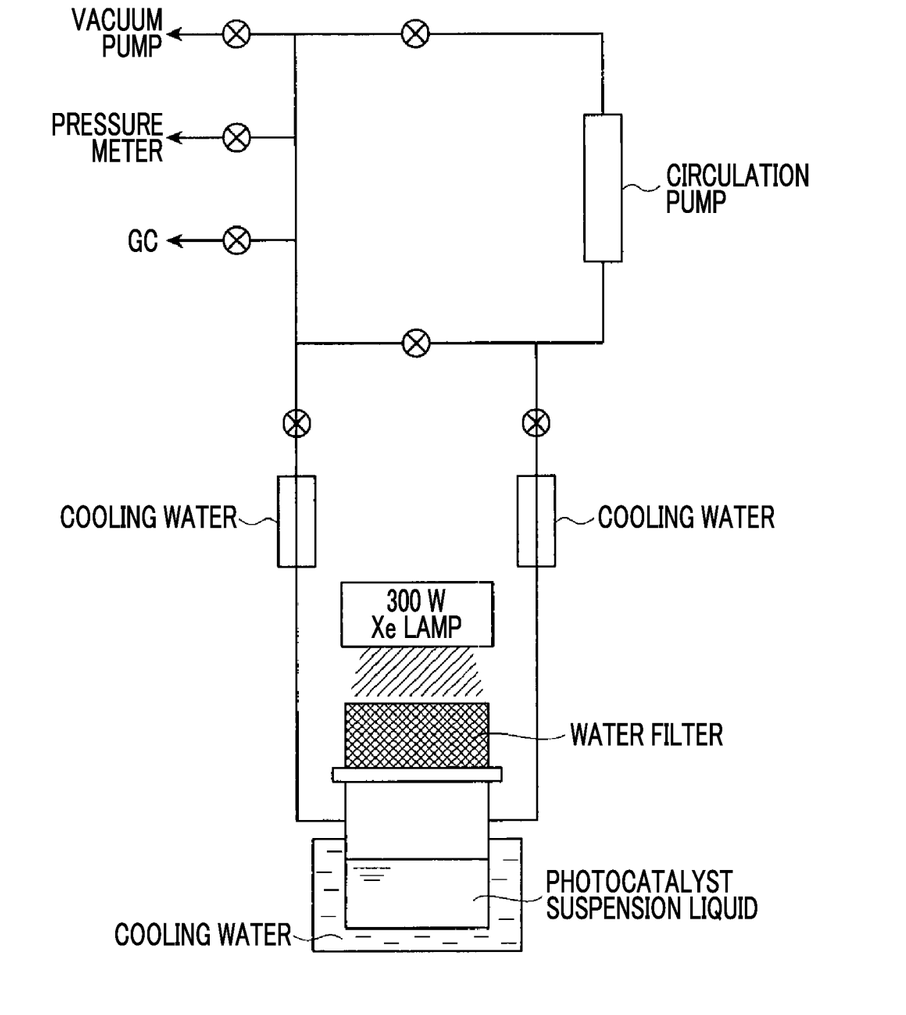
FIG. 1 is a view schematically illustrating an evaluation device of a photoinduced water splitting reaction used in examples.

A photoinduced water splitting reaction (photocatalyst reaction) was measured using a closed circulation reaction system for a photocatalyst manufactured by Makuhari Rikagaku Garasu Inc. More specifically, a photoinduced water splitting reaction was evaluated using a closed reaction apparatus including a vacuum pump, a circulation pump, a cell including the photocatalyst suspension liquid, a gas collection valve, and a gas chromatography analyzer (GC) as illustrated in FIG. 1. Meanwhile, in order to avoid an increase in temperature, a water filter was provided between the lamp and the cell, and furthermore, the cell was cooled from the outside using cooling water. In addition, a 300 W Xenon lamp was used as a light source in combination with a filter having $\lambda > 420$ nm and a cold mirror (having an irradiation wavelength in a range of 400 nm to 800 nm). In Comparative Example 2, a cut-off filter was not used, and a cold mirror (having an irradiation wavelength in a range of 200 nm to 500 nm) was used.

The photocatalyst for water splitting (0.2 g) prepared in each of the examples and the comparative examples was suspended in pure water (200 ml) in a Pyrex (registered trademark) reaction container. Furthermore, silver nitrate (1.7 g) and $La_2O_3$ (0.21 g) were added thereto as a sacrificial reagent and a pH adjuster respectively. A degassing treatment was carried out several times in a state in which the reaction container was in contact with the closed circulation system, and it was confirmed that the residual amounts of oxygen and nitrogen became equal to or lower than the detection lower limit. After that, argon gas was loaded so that the initial pressure reached 50 Torr, then, light irradiation was initiated, and the amount of gas (oxygen) generated was measured. The reaction container was cooled to room temperature using cooling water so that the measurement temperature reached room temperature. The amount of gas generated was determined using gas chromatography. A molecular sieve 5A was used as a column, and the temperature of the column was set to 50° C. The results are summarized in Table 1.

In Table 1, in the column of "firing conditions", "1" indicates firing at 900° C. and "2" indicates firing at 1000° C. respectively.

In the column of "nitriding conditions", "1" indicates "a nitriding treatment in an ammonia flow (200 ml/min) at 929° C. for 15 hours" and "2" indicates "a nitriding treatment in an ammonia flow (500 ml/min) at 1000° C. for 20 hours" respectively.

TABLE 1

| | Firing conditions | Nitriding conditions | Presence or absence of addition | Ba/Nb | Presence or absence of cobalt component | Generation rate (μmol/h) | Note |
|---|---|---|---|---|---|---|---|
| Example 1 | 1 | 1 | Absent | 1.25 | Present | 62 | — |
| Example 2 | 1 | 1 | Present | 1.5 | Present | 129 | — |
| Example 3 | 1 | 1 | Present | 1.75 | Present | 93 | — |

TABLE 1-continued

| | Firing conditions | Nitriding conditions | Presence or absence of addition | Ba/Nb | Presence or absence of cobalt component | Generation rate (μmol/h) | Note |
|---|---|---|---|---|---|---|---|
| Example 4 | 2 | 1 | Absent | 1.25 | Present | 66 | — |
| Example 5 | 2 | 1 | Present | 1.5 | Present | 98 | — |
| Example 6 | 2 | 1 | Present | 2 | Present | 80 | — |
| Example 7 | 1 | 2 | Absent | 1.25 | Present | 18 | — |
| Example 8 | 1 | 2 | Present | 1.5 | Present | 98 | — |
| Example 9 | 1 | 2 | Present | 2 | Present | 79 | — |
| Comparative Example 1 | 1 | 1 | Absent | 1.25 | Absent | 0 | — |
| Comparative Example 2 | 1 | 2 | Absent | 1.25 | Present | 0 | $Ba_5Nb_4O_{15}$ used |
| Comparative Example 3 | 1 | 2 | Absent | 1.25 | Absent | 0 | Pt used |

As shown in Table 1, it was confirmed that the photocatalyst for water splitting of the present invention exhibited an excellent oxygen generation capability (in other words, water splitting performance). Particularly, as is clear from the comparison between Examples 4 to 6, it was confirmed that, in a case in which the compound including a barium atom was added so as to obtain a predetermined Ba/Nb ratio, the generation rate was superior.

On the other hand, in Comparative Example 1 in which the cobalt component was not used, Comparative Example 2 in which $Ba_5Nb_4O_{15}$ was used instead of barium niobium oxynitride, and Comparative Example 3 in which the platinum (Pt) component was used, water splitting performance was not exhibited.

<Production of Water Splitting Photoelectrode>

The photocatalyst for water splitting prepared in Example 2 was suspended in an organic solvent having a low boiling point (solvent: isopropyl alcohol), the suspension liquid was applied onto a support (FL glass), and a titanium conductive layer was formed by means of sputtering, thereby producing a water splitting photoelectrode in which the titanium conductive layer, an adhesive layer, and a photocatalyst layer including the photocatalyst for water splitting were laminated in this order using a particle transfer method (described in Chem. Sci., 2013, 4, 1120 to 1124).

The performance of the water splitting photoelectrode was measured by means of a current-potential measurement in a three-electrode system in which a potentialstat (Hokuto Denko Corp., HSV-110) was used. A flat window-attached Pyrex (registered trade mark) glass electrochemical cell was used, an Ag/AgCl electrode was used as a reference electrode, and a Pt wire was used as a counter electrode. An aqueous solution of 0.1 M NaOH (pH=13) was used as an electrolytic solution. Before the measurement, the inside of the electrochemical cell was filled with argon gas, and furthermore, a bubbling treatment was carried out for 20 minutes or longer using argon gas, thereby removing oxygen and carbon dioxide included in the electrolytic solution in a dissolved state.

In the photoelectrochemical measurement, the photocurrent density ($mA/cm^2$) was measured using a solar simulator (San-Ei Electric Co., Ltd., XES-40S1).

For the water splitting photoelectrode, the photocurrent density was 1.2 V (vs. RHE) and reached a maximum of approximately 0.25 $mA/cm^2$ (AM=1.5D).

Example 10

(Preparation of $BaNb_2O_6$ (Solid-Phase Method))
$Nb_2O_5$ (5.32 g) and $BaCO_3$ (3.95 g) were mixed together (Ba atom/Nb atom (molar ratio)=0.5) and were fired at 1150° C. for five hours. Generation of $BaNb_2O_6$ was confirmed by means of X-ray diffraction (XRD).

(Preparation of $BaNbO_2N$)
After $BaCO_3$ was added to the obtained $BaNb_2O_6$ so that Ba/Nb (molar ratio) reached 1.0, a nitriding treatment was carried out on the mixture in an ammonia flow (500 ml/min) at 1000° C. for 20 hours. After that, the surface of a product was washed with aqua regalis, thereby obtaining barium niobium oxynitride ($BaNbO_2N$). Generation of barium niobium oxynitride was confirmed by means of X-ray diffraction (XRD). In addition, it was confirmed by means of a diffuse reflection spectrum measurement that the absorption edge of barium niobium oxynitride was 730 nm. Meanwhile, the amount of $BaNb_2O_6$ used was 1.7 g.

Meanwhile, Ba/Nb (molar ratio) refers to the molar ratio (Ba/Nb) of the total molar amount of a barium atom derived from $BaNb_2O_6$ and a barium atom derived from $BaCO_3$ to the molar amount of a niobium atom derived from $BaNb_2O_6$ (hereinafter, this shall apply to Examples 11 to 14).

A photocatalyst for water splitting was produced according to the same order as that of the (support of the promoter) in Example 1 using the obtained barium niobium oxynitride. The obtained photocatalyst for water splitting was observed using a SEM-EDX (instrument name: SU-8020, Hitachi High-Technologies Corporation) and a TEM (instrument name: H-8100, Hitachi High-Technologies Corporation) and consequently, it was confirmed that the promoter (cobalt oxide) was supported by barium niobium oxynitride.

Example 11

A photocatalyst for water splitting was produced according to the same order as in Example 10 except for the fact that, in (the preparation of barium niobium oxynitride ($BaNbO_2N$)), $BaCO_3$ was added so that Ba/Nb (molar ratio) reached 1.25.

Example 12

A photocatalyst for water splitting was produced according to the same order as in Example 10 except for the fact that, in (the preparation of barium niobium oxynitride ($BaNbO_2N$)), $BaCO_3$ was added so that Ba/Nb (molar ratio) reached 1.5.

Example 13

A photocatalyst for water splitting was produced according to the same order as in Example 10 except for the fact that, in (the preparation of barium niobium oxynitride (BaNbO$_2$N)), BaCO$_3$ was added so that Ba/Nb (molar ratio) reached 2.0.

Example 14

A photocatalyst for water splitting was produced according to the same order as in Example 10 except for the fact that, in (the preparation of barium niobium oxynitride (BaNbO$_2$N)), BaCO$_3$ was added so that Ba/Nb (molar ratio) reached 2.5.

The above-described <evaluation: photoinduced water splitting reaction> was carried out using the photocatalysts for water splitting obtained in Examples 10 to 14. The results are summarized in Table 2.

TABLE 2

| | Ba/Nb | Generation rate (μmol/h) |
|---|---|---|
| Example 10 | 1.0 | 26 |
| Example 11 | 1.25 | 21 |
| Example 12 | 1.5 | 50 |
| Example 13 | 2.0 | 96 |
| Example 14 | 2.5 | 30 |

As shown in Table 2, it was confirmed that, even in a case in which BaNb$_2$O$_6$ prepared using the solid-phase method was used as a raw material, a desired effect was obtained. Particularly, as described in Examples 12 and 13, in a case in which the Ba/Nb ratio was in a range of 1.5 to 2.0, the effect was superior.

Example 15

(Preparation of Oxide Precursor (Main Component: Ba$_5$Nb$_4$O$_{15}$) (Polarized Complex Method))

NbCl$_5$ (2.93 g), BaCO$_3$ (2.68 g), citric acid (23.5 g), ethylene glycol (30.3 g), and methanol (39.1 g) were mixed together (Ba/Nb (molar ratio)=1.25) and were homogeneously stirred on a hot stirrer, thereby carrying out complexing. Subsequently, the obtained mixture was carbonized by being heated at 350° C. for three hours using a mantel heater (350° C.). Next, the mixture was further heated on an alumina board at 500° C. for five hours, thereby obtaining a white solid. Furthermore, the obtained solid was fired at 700° C. for ten hours. Generation of the obtained Ba$_5$Nb$_4$O$_{15}$ was confirmed by means of X-ray diffraction (XRD).

Meanwhile, the Ba/Nb (molar ratio) refers to the ratio of the molar amount of a barium atom derived from BaCO$_3$ to the molar amount of a niobium atom derived from NbCl$_5$ (hereinafter, this shall apply to Examples 16 to 21).

(Preparation of Barium Niobium Oxynitride (BaNbO$_2$N))

A nitriding treatment was carried out on the obtained Ba$_5$Nb$_4$O$_{15}$ in an ammonia flow (500 ml/min) at 850° C. for 30 hours. After that, the surface of a product was washed with 1 M nitric acid, thereby obtaining barium niobium oxynitride (BaNbO$_2$N). Generation of barium niobium oxynitride was confirmed by means of X-ray diffraction (XRD). In addition, it was confirmed by means of a diffuse reflection spectrum measurement that the absorption edge of barium niobium oxynitride was 740 nm. Meanwhile, the amount of Ba$_5$Nb$_4$O$_{15}$ used was 1.7 g.

Barium niobium oxynitride in which the promoter (cobalt oxide) was supported was obtained according to the same order as that of the (support of the promoter) in Example 1 using the obtained barium niobium oxynitride.

Example 16

A photocatalyst for water splitting was produced according to the same order as in Example 15 except for the fact that, in the (preparation of the oxide precursor (main component: Ba$_5$Nb$_4$O$_{15}$) (polarized complex method)) of Example 15, BaCO$_3$ was added so that Ba/Nb (molar ratio) reached 1.5 and the additive amounts of citric acid, ethylene glycol, and methanol were adjusted so that the ratio between the total molar amount of the molar amount of a barium atom derived from BaCO$_3$ and the molar amount of a niobium atom derived from NbCl$_5$, the molar amount of citric acid, the molar amount of ethylene glycol, and the molar amount of methanol (the molar amount of Ba+the molar amount of Nb:citric acid:ethylene glycol:methanol) reached a ratio of 1:5:20:50. Meanwhile, the amount of Ba$_4$Nb$_6$O$_{19}$ used was 1.7 g.

Example 17

A photocatalyst for water splitting was produced according to the same order as in Example 15 except for the fact that, in the (preparation of the oxide precursor (main component: Ba$_5$Nb$_4$O$_{15}$) (polarized complex method)) of Example 15, BaCO$_3$ was added so that Ba/Nb (molar ratio) reached 2.0, the additive amounts of citric acid, ethylene glycol, and methanol were adjusted so that the ratio between the total molar amount of the molar amount of a barium atom derived from BaCO$_3$ and the molar amount of a niobium atom derived from NbCl$_5$, the molar amount of citric acid, the molar amount of ethylene glycol, and the molar amount of methanol (the molar amount of Ba+the molar amount of Nb:citric acid:ethylene glycol:methanol) reached a ratio of 1:5:20:50, "firing at 900° C. for five hours" was carried out instead of "firing at 700° C. for ten hours", and the nitriding conditions in the (preparation of barium niobium oxynitride (BaNbO$_2$N)) were changed to the "nitriding treatment in an ammonia flow (500 ml/min) at 850° C. for 20 hours".

Example 18

A photocatalyst for water splitting was produced according to the same order as in Example 15 except for the fact that, in the (preparation of the oxide precursor (main component: Ba$_5$Nb$_4$O$_{15}$) (polarized complex method)) of Example 15, BaCO$_3$ was added so that Ba/Nb (molar ratio) reached 3.0 and the additive amounts of citric acid, ethylene glycol, and methanol were adjusted so that the ratio between the total molar amount of the molar amount of a barium atom derived from BaCO$_3$ and the molar amount of a niobium atom derived from NbCl$_5$, the molar amount of citric acid, the molar amount of ethylene glycol, and the molar amount of methanol (the molar amount of Ba+the molar amount of NU:citric acid:ethylene glycol:methanol) reached a ratio of 1:5:20:50.

Example 19

A photocatalyst for water splitting was produced according to the same order as in Example 18 except for the fact that, in the (preparation of the oxide precursor (main component: Ba$_5$Nb$_4$O$_{15}$) (polarized complex method)) of Example 18, "firing at 700° C. for two hours and, furthermore, firing at 800° C. for 2.5 hours" was carried out instead of "firing at 700° C. for ten hours" and the nitriding conditions in the (preparation of barium niobium oxynitride (BaNbO$_2$N)) were changed to "a nitriding treatment in an ammonia flow (500 ml/min) at 850° C. for 15 hours".

Example 20

A photocatalyst for water splitting was produced according to the same order as in Example 19 except for the fact that the nitriding conditions in the (preparation of barium niobium oxynitride (BaNbO$_2$N)) of Example 19 were changed to "a nitriding treatment in an ammonia flow (500 ml/min) at 850° C. for 50 hours".

Example 21

A photocatalyst for water splitting was produced according to the same order as in Example 19 except for the fact that, in the (preparation of the oxide precursor (main component: Ba$_5$Nb$_4$O$_{15}$) (polarized complex method)) of Example 19, firing was carried out using a rotary kiln and the nitriding conditions in the (preparation of barium niobium oxynitride (BaNbO$_2$N)) were changed to "a nitriding treatment in an ammonia flow (500 ml/min) at 850° C. for 60 hours".

Example 22

(Preparation of Barium Niobium Oxynitride (BaNbO$_2$N) (Physical Mixing))

Nb$_2$O$_5$ (0.67 g) and BaCO$_3$ (1.29 g) were mixed together (Ba/Nb (molar ratio)=1.5) and a nitriding treatment was carried out in an ammonia flow (200 ml/min) at 929° C. for 15 hours. After that, the surface of a product was washed with aqua regalis, thereby obtaining barium niobium oxynitride (BaNbO$_2$N). Generation of barium niobium oxynitride was confirmed by means of X-ray diffraction (XRD). In addition, it was confirmed by means of a diffuse reflection spectrum measurement that the absorption edge of barium niobium oxynitride was 740 nm.

Meanwhile, the Ba/Nb (molar ratio) refers to the ratio of the molar amount of a barium atom derived from BaCO$_3$ to the molar amount of a niobium atom derived from Nb$_2$O$_5$ (hereinafter, this shall apply to Examples 23 and 24).

Barium niobium oxynitride in which the promoter (cobalt oxide) was supported was obtained according to the same order as that of the (support of the promoter) in Example 1 using the obtained barium niobium oxynitride.

Example 23

A photocatalyst for water splitting was produced according to the same order as in Example 22 except for the fact that, in the (preparation of barium niobium oxynitride (BaNbO$_2$N) (physical mixing)) of Example 22, the components were mixed together so that Ba/Nb (molar ratio) reached 2.0, the "nitriding treatment in an ammonia flow (200 ml/min) at 929° C. for 15 hours" was changed to "nitriding treatment in an ammonia flow (500 ml/min) at 950° C. for 20 hours", and 1 M nitric acid was used instead of aqua regalis.

Example 24

A photocatalyst for water splitting was produced according to the same order as in Example 23 except for the fact that, in the (preparation of barium niobium oxynitride (BaNbO$_2$N) (physical mixing)) of Example 23, the components were mixed together so that Ba/Nb (molar ratio) reached 3.0.

The above-described <evaluation: photoinduced water splitting reaction> was carried out using the photocatalysts for water splitting obtained in Examples 15 to 24. The results are summarized in Table 3.

In Table 3, in the column of "firing conditions", "3" indicates "firing at 700° C. for ten hours", "4" indicates "firing at 900° C. for five hours", and "5" indicates "firing at 700° C. for two hours and furthermore firing at 800° C. for 2.5 hours" respectively.

In the column of "nitriding conditions", "3" indicates "a nitriding treatment in an ammonia flow (500 ml/min) at 850° C. for 30 hours", "4" indicates "a nitriding treatment in an ammonia flow (500 ml/min) at 850° C. for 20 hours", "5" indicates "a nitriding treatment in an ammonia flow (500 ml/min) at 850° C. for 15 hours", "6" indicates "a nitriding treatment in an ammonia flow (500 ml/min) at 850° C. for 50 hours", "7" indicates "a nitriding treatment in an ammonia flow (500 ml/min) at 850° C. for 60 hours", "8" indicates "a nitriding treatment in an ammonia flow (200 ml/min) at 929° C. for 15 hours", and "9" indicates "a nitriding treatment in an ammonia flow (500 ml/min) at 950° C. for 20 hours" respectively.

TABLE 3

| | Firing conditions | Nitriding conditions | Ba/Nb | Generation rate (μmol/h) |
| --- | --- | --- | --- | --- |
| Example 15 | 3 | 3 | 1.25 | 174 |
| Example 16 | 3 | 3 | 1.5 | 115 |
| Example 17 | 4 | 4 | 2.0 | 195 |
| Example 18 | 3 | 3 | 3.0 | 127 |
| Example 19 | 5 | 5 | 3.0 | 129 |
| Example 20 | 5 | 6 | 3.0 | 143 |
| Example 21 | 5 | 7 | 3.0 | 263 |
| Example 22 | — | 8 | 1.5 | 93 |
| Example 23 | — | 9 | 2.0 | 155 |
| Example 24 | — | 9 | 3.0 | 129 |

As shown in Table 3, it was confirmed that, even in a case in which barium niobium oxynitride produced using a different production method was used, a desired effect was obtained. Particularly, in Example 21 in which a rotary kiln was used, an excellent effect was exhibited. In addition, as described in Example 17, a superior effect was exhibited when the Ba/Nb ratio was in a range of 1.75 to 2.50. In addition, as is clear from comparison between Examples 19 to 20, in a case in which the conditions of the nitriding treatment included 40 hours or longer, a superior effect was exhibited.

Meanwhile, the ratios of the % by atom of an oxygen atom to the % by atom of a nitrogen atom (the % by atom of an oxygen atom/the % by atom of a nitrogen atom) (the O/N ratios) in barium niobium oxynitride obtained in Examples 2, 19, and 20 are shown in Table 4. Meanwhile, the measurement method for the O/N ratio is as described above.

TABLE 4

|  | Firing conditions | Nitriding conditions | Ba/Nb | Generation rate (μmol/h) | O/N ratio |
|---|---|---|---|---|---|
| Example 2 | 1 | 1 | 1.5 | 129 | 4.6 |
| Example 19 | 5 | 5 | 3.0 | 129 | 8.2 |
| Example 20 | 5 | 6 | 3.0 | 143 | 2.2 |

Example 25

(Preparation of Oxide Precursor (Main Component: $Ba_4Nb_6O_{19}$) (Isopoly Acid Method))

$K_4Nb_6O_{19}\cdot nH_2O$ (4.0 was dissolved in water (400 ml), thereby preparing an aqueous solution of $K_4Nb_6O_{19}$. $Ba(OH)_2\cdot 8H_2O$ (9.67 g) was dissolved in water (400 ml), thereby preparing an aqueous solution of $Ba(OH)_2$. The aqueous solution of $Ba(OH)_2$ was added dropwise at 10 ml/min while stirring the aqueous solution of $K_4Nb_6O_{19}$. After the end of the dropwise addition, the components were stirred for 30 minutes. The educed white precipitate was collected using a centrifugal separator and was washed with water (400 ml) three times, thereby obtaining $Ba_4Nb_6O_{19}$. Generation of $Ba_4Nb_6O_{19}$ was confirmed by means of XRD that $Ba_4Nb_6O_{19}$ had a similar structure to $K_4Nb_6O_{19}$, and the composition thereof was confirmed by means of EDX or ICP. After that, the obtained $Ba_4Nb_6O_{19}$ was fired at 700° C. for two hours and further fired at 800° C. for three hours.

Meanwhile, Ba/Nb (molar ratio) in Table 5 below refers to the molar ratio (Ba/Nb) of the molar amount of a barium atom derived from $Ba_4Nb_6O_{19}$ to the molar amount of a niobium atom derived from $Ba_4Nb_6O_{19}$.

(Preparation of Barium Niobium Oxynitride ($BaNbO_2N$))

A nitriding treatment was carried out on the obtained $Ba_4Nb_6O_{19}$ in an ammonia flow (500 sccm) at 850° C. for 30 hours. After that, the surface of a product was washed with aqua regalis, thereby obtaining barium niobium oxynitride ($BaNbO_2N$). Generation of barium niobium oxynitride was confirmed by means of X-ray diffraction (XRD). In addition, it was confirmed by means of a diffuse reflection spectrum measurement that the absorption edge of barium niobium oxynitride was 740 nm. Meanwhile, the amount of $Ba_4Nb_6O_{19}$ used was 1.7 g.

Barium niobium oxynitride in which the photocatalyst for water splitting (promoter (cobalt oxide)) was supported was obtained according to the same order as that of the (support of the promoter) in Example 1 using the obtained barium niobium oxynitride.

Example 26

In the (preparation of barium niobium oxynitride ($BaNbO_2N$)) of Example 25, $BaCO_3$ was added to $Ba_4Nb_6O_{19}$ so that Ba/Nb (molar ratio) reached 2.0, then, a nitriding treatment was carried out, and a photocatalyst for water splitting was produced according to the same order as in Example 25.

Meanwhile, Ba/Nb (molar ratio) refers to the molar ratio (Ba/Nb) of the total molar amount of a barium atom derived from $Ba_4Nb_6O_{19}$ and a barium atom derived from $BaCO_3$ to the molar amount of a niobium atom derived from $Ba_4Nb_6O_{19}$ (hereinafter, this shall apply to Example 27).

Example 27

A photocatalyst for water splitting was produced according to the same order as in Example 26 except for the fact that, in the (preparation of barium niobium oxynitride ($BaNbO_2N$)) of Example 26, the nitriding conditions in the (preparation of barium niobium oxynitride ($BaNbO_2N$)) of Example 26 were changed to a "nitriding treatment in an ammonia flow (500 sccm) at 850° C. for 50 hours".

The above-described <evaluation: photoinduced water splitting reaction> was carried out using the photocatalysts for water splitting obtained in Examples 25 to 27. The results are summarized in Table 5.

In Table 5, in the column of "firing conditions", "6" indicates "firing at 700° C. for two hours and furthermore firing at 800° C. for three hours".

TABLE 5

|  | Firing conditions | Nitriding conditions | Ba/Nb | Generation rate (μmol/h) |
|---|---|---|---|---|
| Example 25 | 6 | 3 | 0.7 | 35 |
| Example 26 | 6 | 3 | 2.0 | 225 |
| Example 27 | 6 | 6 | 2.0 | 87 |

As shown in Table 5, it was confirmed that, even in a case in which barium niobium oxynitride produced using other production methods is used, a desired effect can be obtained.

What is claimed is:

1. A production method for a photocatalyst for water splitting, comprising:
    a step A of mixing barium niobium oxynitride and a cobalt compound and carrying out a heating treatment on an obtained mixture in an atmosphere in which barium niobium oxynitride is not oxidized; and
    further comprising, prior to the step A:
    a step B of mixing an oxide including a barium atom and a niobium atom and a compound which is different from the oxide, includes a barium atom, and may include a niobium atom so that a ratio (Ba molar amount/Nb molar amount) of a total molar amount (the Ba molar amount) of the barium atom derived from the oxide and the barium atom derived from the compound to a total molar amount (the Nb molar amount) of the niobium atom derived from the oxide and the niobium atom derived from the compound falls in a range of 1.3 to 4.0 and carrying out a nitriding treatment on an obtained mixture, thereby obtaining barium niobium oxynitride,
    wherein the photocatalyst for water splitting comprises an optical semiconductor and a promoter supported by the optical semiconductor, wherein the optical semiconductor includes said barium niobium oxynitride, and the promoter includes at least one substance selected from the group consisting of cobalt oxides and metallic cobalt.

2. The production method for the photocatalyst for water splitting according to claim 1,
    wherein the compound which includes a barium atom and may include a niobium atom includes at least one substance selected from a group consisting of barium carbonate and barium nitrate.

3. A production method for a photocatalyst for water splitting, comprising:
    a step A of mixing barium niobium oxynitride and a cobalt compound and carrying out a heating treatment on an obtained mixture in an atmosphere in which barium niobium oxynitride is not oxidized; and further comprising, prior to the step A:
a step C of forming an oxide including a barium atom and a niobium atom by means of a polymerized complex method using a compound including a barium atom, a compound including a niobium atom, and a raw material including a complexing agent; and
a step D of carrying out a nitriding treatment on the oxide, thereby obtaining barium niobium oxynitride,
wherein the step C is a step of forming an oxide including a barium atom and a niobium atom by carrying out a heating treatment on a mixture including a compound including a barium atom, a compound including a niobium atom, and a complexing agent, and a molar amount of the barium atom derived from the compound including a barium atom is larger than a molar amount of the niobium atom derived from the compound including a niobium atom, and
wherein the photocatalyst for water splitting comprises an optical semiconductor and a promoter supported by the optical semiconductor, wherein the optical semiconductor includes said barium niobium oxynitride, and the promoter includes at least one substance selected from the group consisting of cobalt oxides and metallic cobalt.

4. A production method for a photocatalyst for water splitting, comprising:
a step A of mixing barium niobium oxynitride and a cobalt compound and carrying out a heating treatment on an obtained mixture in an atmosphere in which barium niobium oxynitride is not oxidized; and
further comprising, prior to the step A:
a step B of mixing an oxide including a barium atom and a niobium atom and a compound which is different from the oxide, includes a barium atom, and may include a niobium atom so that a ratio (Ba molar amount/Nb molar amount) of a total molar amount (the Ba molar amount) of the barium atom derived from the oxide and the barium atom derived from the compound to a total molar amount (the Nb molar amount) of the niobium atom derived from the oxide and the niobium atom derived from the compound falls in a range of 1.3 to 4.0 and carrying out a nitriding treatment on an obtained mixture, thereby obtaining barium niobium oxynitride,
wherein the photocatalyst for water splitting comprises an optical semiconductor and a promoter supported by the optical semiconductor, wherein the optical semiconductor includes said barium niobium oxynitride, and the promoter includes at least one substance selected from the group consisting of cobalt oxides and metallic cobalt, and wherein an amount of the promoter supported is in a range of 0.001 parts by mass to 20 parts by mass with respect to 100 parts by mass of the optical semiconductor.

5. The production method for the photocatalyst for water splitting according to claim 4,
wherein the compound which includes a barium atom and may include a niobium atom includes at least one substance selected from a group consisting of barium carbonate and barium nitrate.

6. A production method for a photocatalyst for water splitting, comprising:
a step A of mixing barium niobium oxynitride and a cobalt compound and carrying out a heating treatment on an obtained mixture in an atmosphere in which barium niobium oxynitride is not oxidized; and
further comprising, prior to the step A:
a step C of forming an oxide including a barium atom and a niobium atom by means of a polymerized complex method using a compound including a barium atom, a compound including a niobium atom, and a raw material including a complexing agent; and
a step D of carrying out a nitriding treatment on the oxide, thereby obtaining barium niobium oxynitride,
wherein the step C is a step of forming an oxide including a barium atom and a niobium atom by carrying out a heating treatment on a mixture including a compound including a barium atom, a compound including a niobium atom, and a complexing agent, and a molar amount of the barium atom derived from the compound including a barium atom is larger than a molar amount of the niobium atom derived from the compound including a niobium atom,
wherein the photocatalyst for water splitting comprises an optical semiconductor and a promoter supported by the optical semiconductor, wherein the optical semiconductor includes said barium niobium oxynitride, and the promoter includes at least one substance selected from the group consisting of cobalt oxides and metallic cobalt, and wherein an amount of the promoter supported is in a range of 0.001 parts by mass to 20 parts by mass with respect to 100 parts by mass of the optical semiconductor.

7. The production method for the photocatalyst for water splitting according to claim 1,
wherein the cobalt compound includes at least one substance selected from a group consisting of cobalt nitrate and cobaltammine complexes.

8. The production method for the photocatalyst for water splitting according to claim 2,
wherein the cobalt compound includes at least one substance selected from a group consisting of cobalt nitrate and cobaltammine complexes.

9. The production method for the photocatalyst for water splitting according to claim 3,
wherein the cobalt compound includes at least one substance selected from a group consisting of cobalt nitrate and cobaltammine complexes.

* * * * *